United States Patent [19]

Candy

[11] Patent Number: 5,563,498

[45] Date of Patent: Oct. 8, 1996

[54] POWER SUPPLY REGULATOR

[75] Inventor: Bruce H. Candy, Basket Range, Australia

[73] Assignees: Halcro Nominees Pty Ltd.; BHC Consulting Pty Ltd., both of Glenside, Australia

[21] Appl. No.: 185,940

[22] PCT Filed: Jul. 17, 1992

[86] PCT No.: PCT/AU92/00358

§ 371 Date: Jan. 18, 1994

§ 102(e) Date: Jan. 18, 1994

[87] PCT Pub. No.: WO93/02407

PCT Pub. Date: Feb. 4, 1993

[30] Foreign Application Priority Data

Jul. 17, 1991 [AU] Australia .................................. PK7229

[51] Int. Cl.⁶ .................................. G05F 1/613; G05F 3/16; G05F 1/618
[52] U.S. Cl. .................................. 323/224; 323/326
[58] Field of Search .................................. 323/224, 226, 323/222, 282–285

[56] References Cited

U.S. PATENT DOCUMENTS

| | | | |
|---|---|---|---|
| 4,459,537 | 7/1984 | McWhorter | 323/224 |
| 4,618,812 | 10/1986 | Kawakami | 323/224 |
| 4,812,736 | 3/1989 | Albach et al. | 323/224 |
| 5,216,351 | 6/1993 | Shimoda | 323/224 |

*Primary Examiner*—Peter S. Wong
*Assistant Examiner*—Bao Q. Vu
*Attorney, Agent, or Firm*—Adams & Wilks

[57] ABSTRACT

An apparatus and method for supplying a regulated direct electric current comprises a switch mode regulator having an input for receiving a varying source of electrical power. A linear regulator provides a source of low noise direct current and has an input connected so as to receive a voltage that is dependent upon an output of the switch mode regulator. A first servo-loop provides a first control signal to the switch mode regulator. The first control signal is varied according to a variation in the voltage across the linear regulator. A second servo-loop provides a second control signal to the linear regulator. The second control signal is varied according to the difference between a voltage that is related to an output of the linear regulator and a reference voltage. The second servo-loop has a higher gain than the first servo-loop when both of the servo-loops are operating at frequencies that are within their operating frequency ranges.

12 Claims, 2 Drawing Sheets

POWER SUPPLY REGULATOR

BACKGROUND OF THE INVENTION

This invention relates to an apparatus for supplying regulated direct electrical current and a method of effecting regulation of a direct current output from a switch mode regulator.

The problem to which this invention is directed relates to the problem of losses normally occasioned when attempting to provide a direct current switch mode regulated power supply with low noise.

It is well known to use a switch mode power supply to provide a regulated output.

However, using a switch mode technique inherently provides a high noise content and it has been conventional, if lower noise characteristics are required, to have the output fed into the input of a linear regulator.

A linear regulator of current design is inherently inefficient and significant power will be conventionally lost through the linear regulator with conventional circuit layouts.

Unfortunately, such inefficiency means that more power must be provided by the switch mode regulator with resultant larger heat dissipation and sizes of components becomes more of a problem.

An object of this invention is to provide an apparatus incorporating both a switch mode regulator and a linear regulator which are coupled in such a way that these can be caused to work in a more efficient way than has hitherto been the case.

SUMMARY OF THE INVENTION

According to this invention there is provided an apparatus for supplying regulated direct electrical current including a switch mode regulator with an input adapted to receive a varying source of electrical power, the output of the switch mode regulator being directed into the input of a linear regulator, and the output of the linear regulator being available as a source of low noise output direct current electrical power, the apparatus being characterised in that the voltage between the input and the output of the linear regulator is directed into and connected to the switch mode regulator such that the said voltage will act as a reference voltage for the regulation of the output voltage of the switch mode regulator.

Preferably, the linear regulator includes a controlling servo-loop with an output which is controlled by an input comprising a voltage signal which is the difference in voltage between a selected portion of the voltage of the linear regulator output on the one hand and a selected fixed reference voltage on the other hand, and the switch mode regulator includes a controlling servo-loop the output of which is controlled by a voltage signal which is the difference in voltage between the voltage between the input and output signal of the linear regulator on the one hand and a selected fixed reference voltage on the other hand.

Preferably, the first mentioned servo-loop has a substantially higher gain than that of the second mentioned servo-loop.

The invention can also apply to a method of effecting regulation of a direct current output from a switch mode regulator the output of which is being directed through a linear regulator, the method including the steps of supplying a varying supply of electrical power to the input of the switch mode regulator, taking a resultant voltage across the input and output of the linear regulator and directing this into the switch mode regulator such that it will be used as a reference voltage for controlling the output voltage of the switch mode regulator.

For a better understanding, this invention will now be described with reference to a preferred embodiment which shall be described with the assistance of drawings in which:

BRIEF DESCRIPTION OF PREFERRED EMBODIMENTS

Figure 1:
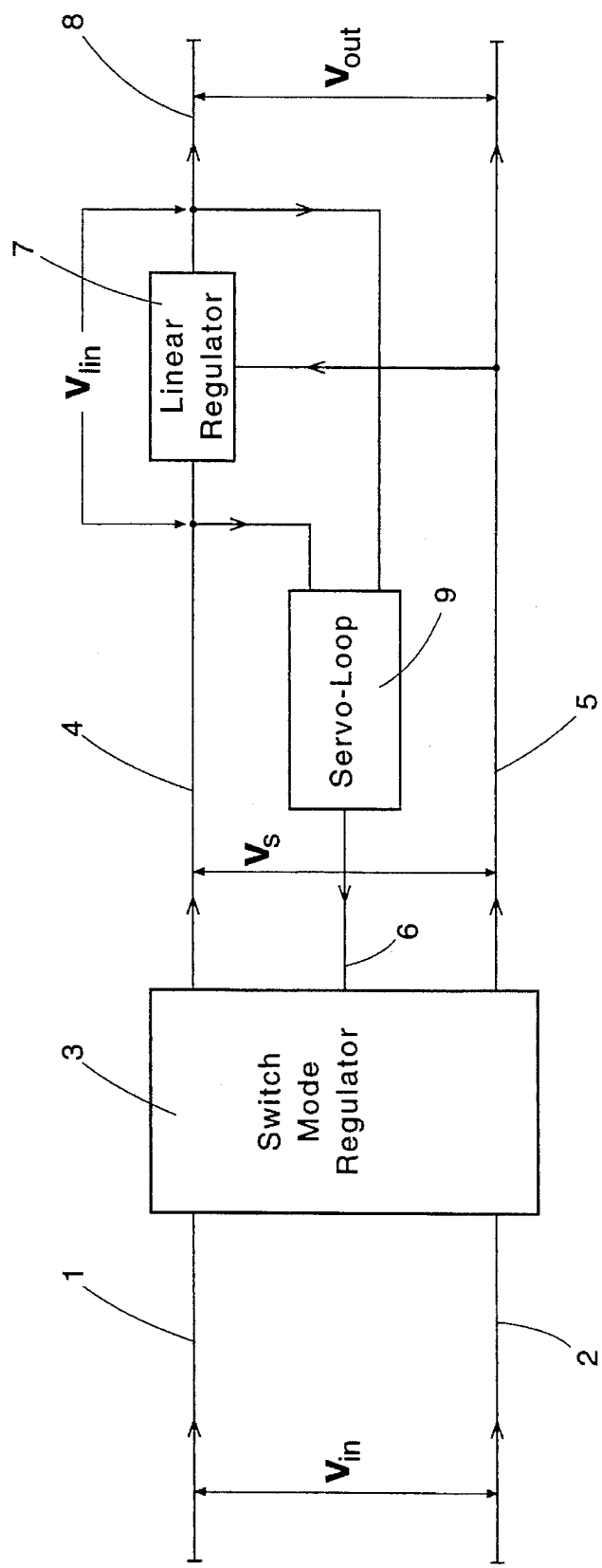
FIG. 1 is a schematic drawing shown in block outline the arrangement of the embodiment, the elements of which include a switch mode regulator, a linear regulator, and a servo-loop.

Referring in the first instance to FIG. 1, there is an input provided by input conductors 1 and 2 to a switch mode regulator 3. The output of the switch mode regulator 3 is fed by way of conductors 4 and 5 to a linear regulator 7. The output of the switch mode regulator 3 is controlled by the signal 15 being introduced on conductor 6.

The output from the linear regulator 7 is provided through a conductor 8 referenced to conductor 5.

A difference amplifier servo-loop 9 has an input comprising the voltage between the input 4 and the output 8 of the linear regulator 7 which thereby is directed into and connected to the switch mode regulator 3 such that said voltage will act as a reference voltage with the regulation of the output voltage $V_s$ of the switch mode regulator 3.

Accordingly, as shown, the instantaneous voltage between conductors 4 and 5 is $V_s$ and between conductors 5 and 8 is $V_{out}$. The voltage difference existing between conductors 4 and 8 is accordingly $V_{lin} = V_s - V_{out}$.

In order to avoid large linear regulator inefficiencies, $V_{lin}$ should be kept at a very low level (At least below 1 Volt).

One of the difficulties that occurs in a practical situation is that circuit component tolerances can mean that the $V_{lin}$ can fall outside of acceptable levels either going negative or going too high.

Accordingly, the arrangement is such that the switch mode regulator 3 has its output controlled by $V_{lin}$ instead of the output of the switch mode regulator 3. As is shown $V_{lin}$ is fed through the difference amplifier cum servo-loop 9. Thus the linear regulator's output is used to control its regulation via a servo-loop and the output of the switch mode regulator is controlled by the voltage drop across the linear regulator 7, namely $V_{lin}$ (not as is usually the case by $V_s$). Hence $V_{lin}$ may be kept below say ½ a volt or less without any potential component tolerances problem potentially causing regulators 3 and 7 to stop regulating.

While reference has been made to voltage regulation, the same principle can be applied for current regulation or a combination of both, for instance, having a regulated voltage but limiting current supply such as is used in most electronic laboratory "bench type" supplies.

The apparatus as described provides a switch mode regulator followed by a linear regulator as is conventionally recommended in much literature for low noise and moderately high power of efficiency. In the arrangement which is conventional however, the two regulators namely the switch mode regulator and the linear regulator are essentially connected in series and operate each effectively independent of the other. Accordingly, the switch mode regulator has its own servo-loop controlling its own output by comparison between its output and a reference voltage, and a linear regulator has its servo-loop controlling its output by comparison to its own output and a reference.

The difference, therefore, between this embodiment and the prior art becomes more apparent namely in the particular concept that the linear regulator has its servo-loop controlling its output by comparison between its output and a reference, but the switch mode regulator which feeds the linear regulator is controlled by its servo-loop which depends only upon the difference between a reference and the difference between the input and output voltages across the linear regulator and not on the output of the switch mode regulator.

It is a very complex matter to calculate the servo-loop stabilities in this last mentioned case compared to the conventional arrangement because in the latter case particularly, the servo-loops will substantially interact with each other.

My discovery has been, after considerable calculations and trials, that it is possible to have an arrangement in accord with this invention which will be stable and that this provides significant advantages.

One way in which this can be achieved is to ensure that, at any particular operating frequency, the servo-loop controlling the linear regulator has a substantially higher gain than a servo-loop controlling the switch mode regulator.

Conventionally, servo-loop "amplifiers" have an "infinite" DC gain, but have a continuously decreasing gain with frequency. There is usually provided in such servo-loop amplifiers a loss element for damping purposes. In this embodiment, the servo-loop amplifier controlling the switch mode regulator having a substantially lower-gain at any particular frequency, than the servo-loop amplifier controlling the linear amplifier will have the result of keeping the arrangement stable. The amplifier response of the servo-loop controlling the linear regulator may in one instance simply be that of the operational amplifier conventionally used in these devices without any feedback capacitors or resistors.

Figure 2:
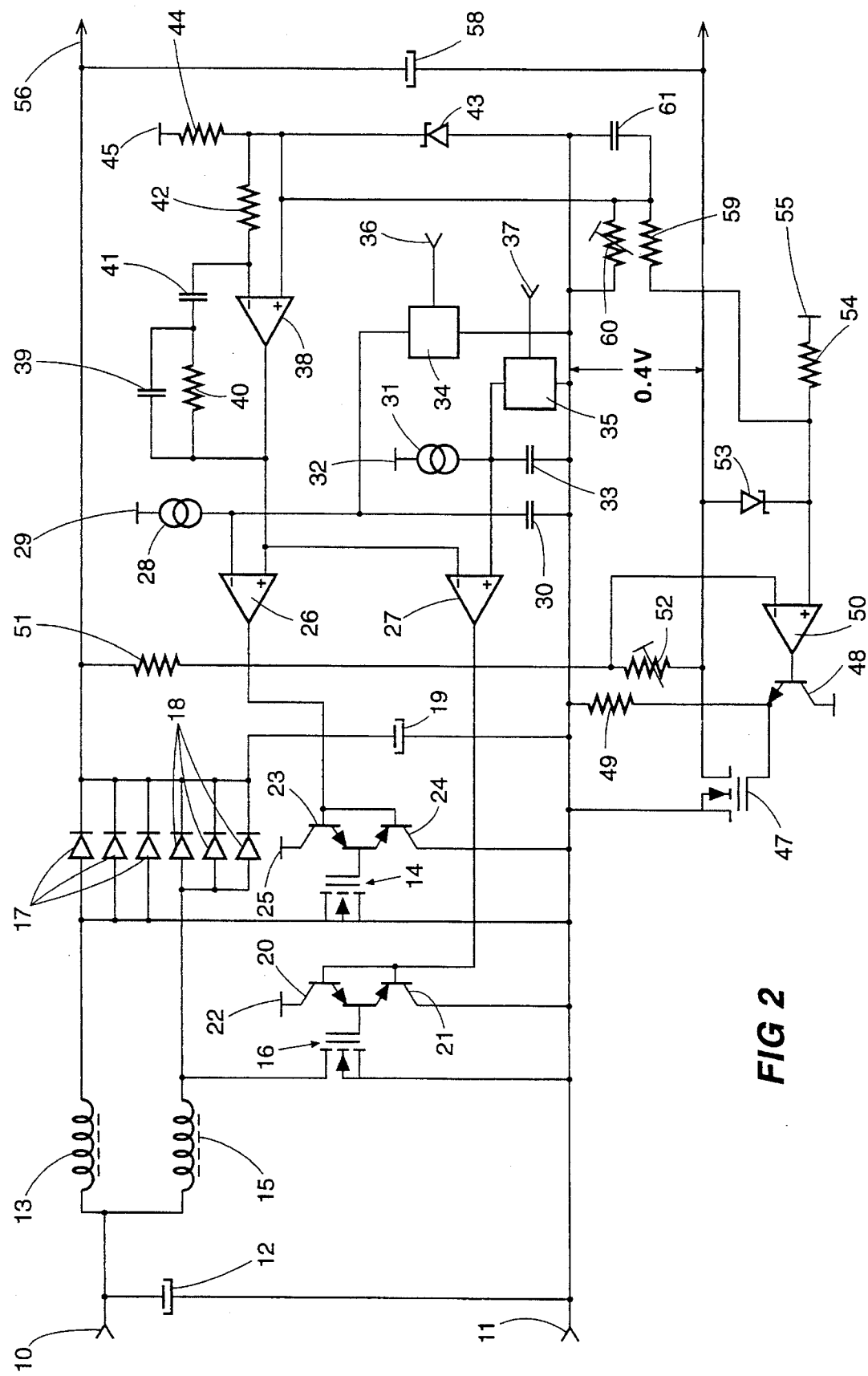
FIG. 2 is a circuit schematic for a fixed voltage supply regulator incorporating the embodiment.

Now referring to the circuit schematic as shown in FIG. 2, there are conductors 10 and 11 adapted to receive a varying input supply and which act as input to a switch mode regulator and a linear regulator. The positive side 10 and the negative side 11 has capacitor 12 (0.01 Farads) located across them to provide smoothing.

An inductor 13 (200 uH) is connected between conductor 10 and the drain of a power field effect transistor 14 (IRFD240). An inductor 15 (200 uH) is connected between conductor 10 and the drain of power field effect transistor 16 (IRFD240). The sources of field effect transistors 14 and 16 are connected to conductor 11.

The drain of field effect transistor 14 is connected to the anode of paralleled diodes 17 (BYV28-200). The drain of field effect transistor 16 is connected to the anodes of paralleled diodes 18 (BYV28-200). The cathodes of paralleled diodes 17 and 18 are connected to a smoothing capacitor 19 (0.01 Farad) which is also connected to conductor 11.

Buffer emitter followers 20 and 21 (BC368 and BC369) feed the gate of field effect transistor 16. These are supplied by a separate power supply of 15 volts at 22 relative to the conductor 11. Buffer emitter followers 23 and 24 (BC368 and BC369) feed the gate of field effect transistor 14. These are also supplied by a separate power supply of 15 volts.

The input to the buffers 23 and 24 is a comparator 26. The non-inverting input of the comparator 26 is connected to a current supply at 28 which is fed from a 15 volt power supply at 29.

This same power supply feeds capacitor 30 (2.2 nanoFarads) which is connected to conductor 11.

Similarly, buffers 20 and 21 are fed from a comparator 27. The non-inverting input of comparator 27 is connected to a current source 31 fed from a 15 volt power supply 32. This power supply also feeds capacitor 33 (2.2 nanoFarads) which is connected to conductor 11. Capacitor 30 is arranged to be periodically shorted to conductor 11 by means of an electronic switching element 34 (4066) which is controlled by an external 20 kHz control signal. Capacitor 33 is periodically shorted to conductor 11 by an electronic switching element 35 (4066) which is controlled by an input 20 kHz signal at 37. Inputs at 36 and 37 are arranged to be out of phase one with respect to the other. Both the inverting inputs of comparators 26 and 27 are supplied by an operational amplifier 38. Filter capacitors and resistors 39, 40 and 41 (2.2 nanoFarads, 82 k Ohms and 22 nanoFarads) form part of the feedback servo-loop filters. A resistor 42 (4.7 k) feeds the inverting input of operational amplifier 38 from a constant voltage supplied by a voltage reference zener diode 43 which is referenced to conductor 11 and supplied by a resistor 44 (5.6 k Ohms) connected to a 15 volt power supply 45. Conductor 11 is connected to a control field effect transistor 47 of the linear regulator part of the total circuit. This field effect transistor 47 has its drain connected to a conductor 57 which also is the output of the apparatus as a whole. The other output, a conductor 56, is coupled to the cathodes of the paralleled diodes 17 and 18 and are as well connected to storage capacitor 19.

The gate of field effect transistor 47 is supplied by an emitter follower 48 which is supplied by a separate power supply of 15 volts and has an emitter connected to conductor 11 by a resistor 49 (1 k Ohms). The base of emitter follower transistor 48 is fed from the output of an operational amplifier 50. A potential divider consisting of resistors 51 and 52 (180 k Ohms, 10 k Ohms) lying between the output supply conductors 56 and 57 supplies the inverting input of operational amplifier 50 while the non-inverting input is fed from a voltage reference 53 (5 voltage zener diode) referenced to conductor 57 and fed from a small signal supply 55 via a resistor 54 (5.6 k Ohms). This referenced voltage feeds a voltage divider consisting of resistors 59 and 60 (470 Ohms and 10 k Ohms) which is connected to conductor 11. The potential divider output from resistors 59 and 60 feeds the non-inverting input of operational amplifier 38. A capacitor 61 (10 nanoFarads) also is connected to this potential divider of resistors 59 and 60 and reference of conductor 11 and this is part of the servo-loop filter of the switch mode regulator. A storage capacitor 58 (0.01 Farad) lies between output conductors 56 and 57.

In use, the voltage difference between conductor 11 and conductor 57 can be controlled by control of variable resistor 60 and this should be kept so that the voltage difference here is below 1 volt and, in the present embodiment, 0.4 volts has been found to be preferred.

Operational amplifier NE5534 is selected so as to have a gain at any frequency which is a substantially higher gain than that of the servo-loop controlling the switch mode regulator.

Results from such an arrangement have shown that such an arrangement provides useful results in so far that for a given power output, the noise level or ripple level will be significantly reduced by using such an arrangement as compared to the previous orthodox arrangement.

Further, such an arrangement can be provided using components which are within conventional tolerances and yet which nonetheless can be run in such a way as to provide for significantly reduced power losses.

Efficient regulated direct current power supplies with unregulated inputs usually employ switch mode power supply technology which is a very well known art and used extensively in commercial products. All previous arrangements use at least one inductor to store energy and at least one switching element and most use diodes for the application. Sometimes switching elements are used for rectification purposes. It is well known that switch mode power supplies all have ripple on their outputs due to the pulsed nature of the supply and most also are not noted for their ability to regulate well. Hence many designs include a linear regulator as well, following the switch mode supply. Linear regulators are inefficient. Beside the power drawn by their control circuitry, the energy lost in heat is $\int Vi\, dt$, where V is the instantaneous voltage between the input voltage feeding the linear regulator and output of the regulator, and i is the instantaneous current flowing through the regulator. (This assumes that there is no significant reactive element in the path of the current i which is storing energy). Both the linear and switch mode regulator am regulated according to their own outputs either in terms of current or voltage depending on the type of regulation required. In order to avoid excessive inefficiencies, the voltage across the regulators should be kept as low as possible but not so low that circuit tolerances will allow the possibility of this voltage becoming so small that regulation ceases. As has been shown, a figure of approximately 0.4 or 0.5 volts is a figure that has been found to be a useful compromise in the situation.

I claim:

1. An apparatus for supplying regulated direct electrical current, the apparatus comprising:
    a switch mode regulator having an input for receiving a varying source of electrical power;
    a linear regulator for providing a source of low noise output of direct current electrical power, the input of the linear regulator being connected to receive a voltage dependent upon an output of the switch mode regulator;
    a first servo control loop for providing a control signal to the switch mode regulator, the control signal to the switch mode regulator being varied due to variations in the voltage across the linear regulator; and
    a second servo control loop for providing a control signal to the linear regulator, the control signal to the linear regulator being varied due to the difference between a voltage related to the linear regulator's output and a reference voltage, wherein the second servo control loop has a higher gain than the first servo control loop when the first and second servo control loops are operating at frequencies within their operating frequency ranges.

2. An apparatus as claimed in claim 1; wherein the voltage across the linear regulator is maintained below 1 volt.

3. An apparatus as claimed in claim 2; wherein the control signal to the switch mode regulator is a pulse width modulated signal, the width of the pulses of the pulse width modulated signal being varied by voltage variations across the linear regulator.

4. An apparatus as claimed in claim 3; wherein the magnitude of the voltage of the control signal to the linear regulator is varied due to the difference between a voltage related to the linear regulator's output and a reference voltage.

5. An apparatus as claimed in claim 4; wherein the gain of the second servo control loop is at least 10 times higher than that of the first servo control loop.

6. A method of effecting regulation of a direct current output from a switch mode regulator, the direct current output being connected to a linear regulator, the method comprising the steps of:
    supplying a varying supply of electrical power to the input of the switch mode regulator;
    providing a switch mode regulated supply of electrical power from the switch mode regulator to a linear regulator to provide a regulated low noise direct current supply;
    sensing and processing variations in the voltage across the linear regulator to provide a control signal to the switch mode regulator; and
    sensing and processing the difference between a reference voltage and a voltage proportional to the linear regulator's output to provide a control signal to the linear regulator, wherein the sensitivity of the processing variations in the voltage across the linear regulator is less than the sensitivity of the processing of the difference between the reference voltage and the voltage proportional to the linear regulator's output.

7. An apparatus as claimed in claim 1; wherein the control signal to the switch mode regulator is a pulse width modulated signal, the width of the pulses of the pulse width modulated signal being varied by voltage variations across the linear regulator.

8. An apparatus as claimed in claim 1; wherein the magnitude of the voltage of the control signal to the linear regulator is varied due to the difference between a voltage related to the linear regulator's output and a reference voltage.

9. An apparatus as claimed in claim 1; wherein the gain of the second servo control loop is at least 10 times higher than that of the first servo control loop.

10. An apparatus as claimed in claim 2; wherein the magnitude of the voltage of the control signal to the linear regulator is varied due to the difference between a voltage related to the linear regulator's output and a reference voltage.

11. An apparatus as claimed in claim 2; wherein the gain of the second servo control loop is at least 10 times higher than that of the first servo control loop.

12. An apparatus as claimed in claim 3; wherein the gain of the second servo control loop is at least 10 times higher than that of the first servo control loop.

* * * * *